United States Patent [19]

Rice

[11] Patent Number: 5,111,437
[45] Date of Patent: May 5, 1992

[54] METHOD FOR POSITIONING SEISMIC SOURCES TO FLATTEN CDP FOLD IN VSP SURVEYS

[75] Inventor: James A. Rice, Houston, Tex.

[73] Assignee: Exxon Production Research Company, Houston, Tex.

[21] Appl. No.: 739,951

[22] Filed: Aug. 5, 1991

[51] Int. Cl.$^5$ .............................................. G01J 1/36
[52] U.S. Cl. ........................................ 367/57; 367/56; 367/58
[58] Field of Search ................ 367/56, 57, 58, 47, 367/37; 181/108, 111, 112

[56] References Cited

U.S. PATENT DOCUMENTS

| | | | |
|---|---|---|---|
| 4,203,161 | 5/1980 | Johnson et al. | 367/40 |
| 4,209,854 | 6/1980 | Ruehle | 367/43 |
| 4,241,429 | 12/1980 | Bloomquist et al. | 367/52 |
| 4,365,322 | 12/1982 | Widrow | 367/32 |
| 4,476,551 | 10/1984 | Ruehle | 367/43 |

Primary Examiner—Ian J. Lobo
Attorney, Agent, or Firm—Exxon Production Research Company

[57] ABSTRACT

Method and system for creating a vertical seismic profile (VSP) whereby the spacing interval between units, either seismic sources or receivers, in a borehole increase exponentially as their distance from the surface increases, and the spacing interval between units, either seismic sources or receivers, along the surface of the earth decreases exponentially as their distance from the surface intercept of the wellbore increases. In a preferred embodiment of this invention, the common depth point (CDP) fold of the data gathered is substantially flattened across the reflectors surveyed.

60 Claims, 3 Drawing Sheets

METHOD FOR POSITIONING SEISMIC SOURCES TO FLATTEN CDP FOLD IN VSP SURVEYS

BACKGROUND OF THE INVENTION

1. Field of the Invention

This invention relates to a method for positioning seismic sources and receivers in vertical seismic profile surveys (VSF's) to obtain a uniform distribution of common depth point data.

2. Description of the Related Art

A vertical seismic profile (VSF) is a seismic data gathering activity in which either the seismic receivers or the seismic sources are positioned at various depths in a drilled well. VSP surveys are closely related to horizontal seismic surveys. Both involve the propagation of seismic energy, from seismic sources, through the earth, to seismic receivers. The arrival times and character of the seismic waves are recorded. This data is typically further processed to eliminate or minimize spurious signals, and the resulting record provides significant information about the section of the earth through which the seismic energy passed.

The geometry of the VSP presents particular problems, however, which are not encountered in horizontal seismic surveys. In a horizontal survey, the positions available for placement of seismic sources and receivers are virtually unlimited. In a VSP, one leg of the survey is fixed, and is limited to the location of the wellbore. Depth positions are limited to depths approximately between the surface intercet of the wellbore and the well's total depth. This limitation presents a problem of diminishing fold across the reflectors surveyed.

In both horizontal and VSP surveys, the record of signals received by a receiver or single group of receivers is called a trace. During the processing stage, traces are stacked to eliminate spurious signals and the stacked traces represent a reflection from a common depth point (CDP) or point of reflection on the reflector surveyed. The number of traces stacked, which depends upon the number of source-receiver pairs which have received data reflected from a common depth point, is the fold.

Because of the limited geometry of the VSP, not all common depth points on a reflector will have the same fold, or number of traces stacked to represent them. Conventional practice positions sources and receivers at equally spaced locations along the surface and in the wellbore. Typical spacing between sources or receivers in the borehole is 10 to 25 meters, and typical spacing along the surface of the earth is hundreds of meters. With this equally spaced positioning, CDP fold for a reflector surveyed falls rapidly as the CDP point moves radially away from the borehole. This results in VSP data which has poorer resolution and a higher noise to signal ratio away from the wellbore. VSP data with fold fall-off is also poorly comparable with horizontal sections with which one may wish to "tie" the VSP survey.

Efforts to eliminate the reflection signal's amplitude degradation with increasing distance from the borehole due to CDP fold fall off problem in VSP's have centered on the processing phase of seismic exploration. Data is collected in a traditional manner, and then processed to compensate, somewhat, for a lack of fold. Most commonly, a technique known as amplitude gaining is employed to enhance data received from areas of the reflectors with fewer fold. This technique is not totally satisfactory because it destroys the true amplitude of the traces. True amplitude is useful both in making an accurate tie with horizontal surveys and in newer exploration techniques, such as direct hydrocarbon imaging (DHI). DHI requires retention of true amplitudes in a final record, as these amplitudes may be indicative of the fluid type (i.e. hydrocarbon) in the rock.

SUMMARY OF THE INVENTION

The invention provides a method and system for creating a vertical seismic profile (VSP), whereby the spacing interval between units, either seismic sources or receivers, in a borehole increases exponentially as their distance from the surface increases, and the spacing interval between units, either seismic sources or receivers, along the surface of the earth decreases exponentially as their distance from the surface intercept of the wellbore increases.

In a preferred embodiment of this invention, the CDP fold of the data gathered is substantially flattened across the reflectors surveyed. The initial parameters are selected: the depth of the well in which the VSP will be run is known, as is an approximate depth to a reflector of interest. Initial surface and depth spacing intervals are chosen based on aliasing conditions known in the art. One embodiment of the invention then provides that surface locations of either seismic receivers or sources are positioned exponentially closer together as their distance from the wellbore increases. Another embodiment of the invention provides that the distance between depth locations of either seismic sources or receivers in the wellbore increases exponentially with increasing depth in the wellbore. Data received from an apparatus with sources and receivers so positioned exhibits substantially flattened CDP fold prior to processing. Processing techniques which destroy or mask true amplitude are therefore unnecessary to generate data with improved signal to noise ratio away from the wellbore.

These figures are not intended to define the present invention, but are provided solely for the purpose of illustrating certain preferred embodiments and applications of the present invention.

DETAILED DESCRIPTION OF THE PREFERRED EMBODIMENT

In accordance with one embodiment of the present invention, there is provided a system for sending and receiving seismic signals. A plurality of seismic sources is positioned at or near the surface of the earth, and a plurality of seismic receivers are positioned, as indicated at 2 in FIG. 1, in a wellbore, as indicated at 4. The distance between a pair of adjacent seismic receivers, $\Delta z$, as indicated at 6 in FIG. 1, increases exponentially as a second distance, z, as indicated at 8 in FIG. 1, measured from the closer of the pair of adjacent seismic receivers, indicated at 10 in FIG. 1, to the surface intercept of the wellbore, indicated at 12 in FIG. 1, increases. Thus, in contrast to conventional VSP shooting, where seismic receiver positions are located at equally-spaced intervals, the seismic receivers in this system are positioned increasingly further apart as one goes further from the surface intercept of the wellbore. The sources in this system may be positioned at any locations at or near the surface of the earth.

Figure 1:
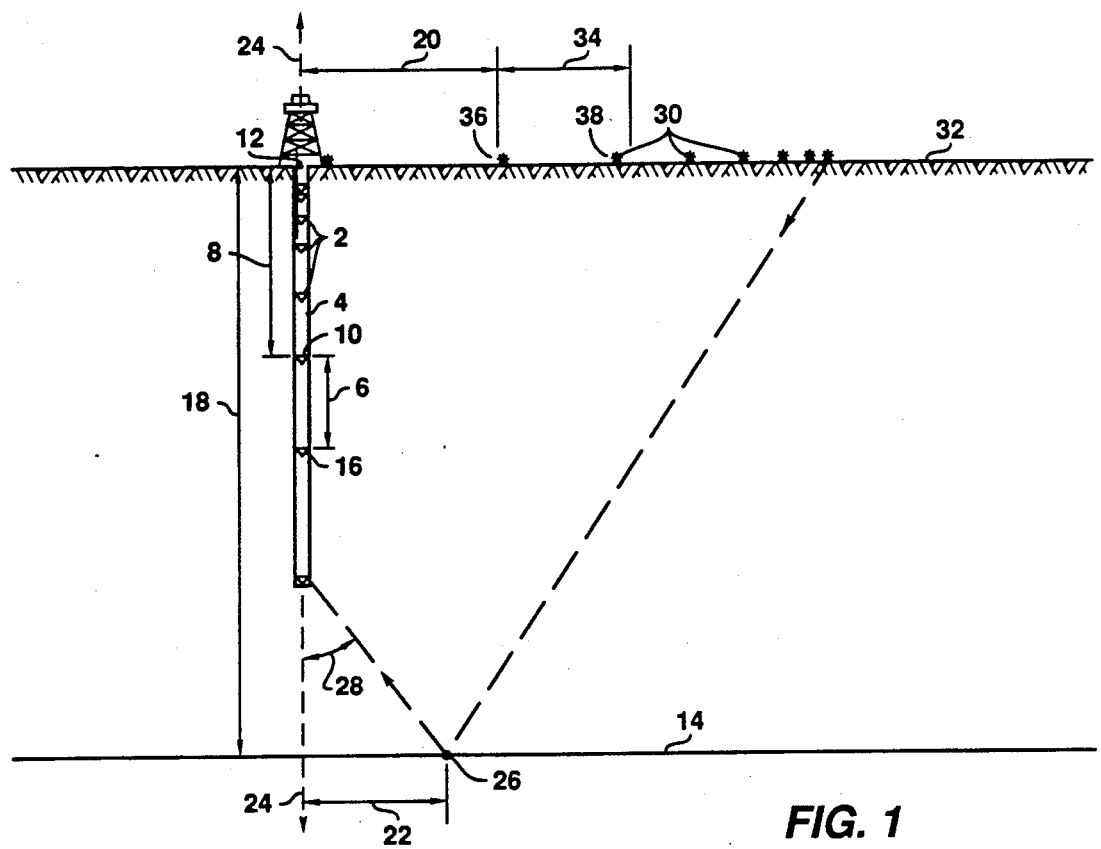
FIG. 1 illustrates pictorially the basic components of a vertical seismic profile, with sources and receivers positioned as taught by this invention.

In a preferred embodiment of this invention, a distribution of CDP fold recorded by this system is substantially equalized, or flattened, across a reflector surveyed, indicated at 14 in FIG. 1.

In a more preferred embodiment of this invention, a plurality of seismic receivers, indicated at 2 in FIG. 1, are positioned such that Equation I is satisfied:

$$\Delta z = (e^{\beta z})(z') \qquad (I)$$

A first distance, $\Delta z$, indicated at 6 on FIG. 1, is measured between a pair of adjacent seismic receivers, indicated by 10 and 15 in FIG. 1. A second distance, z, as indicated at 8 in FIG. 1, is less than or equal to the total depth of the wellbore and is measured from the closer of the pair of adjacent seismic receivers, indicated at 10 in FIG. 1, to the surface intercept of the wellbore, indicated at 12 in FIG. 1. $\beta$ is a constant, and e is a constant approximately equal to 2.718. The variable is an initial depth spacing interval based on aliasing considerations. To prevent data from having uncertain phase associated with sampling less densely than the Fourier criterion of at least 2 sample locations per wavelength, the standard procedure is to: (1) Determine the minimum speed of sound among the geologic layers for P-waves, S-waves, and Stoneley or "tube" waves in a borehole (or Rayleigh waves, also known as "ground roll," on the surface); (2) Determine the maximum frequency of seismic signals useful for reflection imaging, apply analog filters during field operations to remove the higher frequencies, and then (3) Set the spatial sampling density, in this case z', equal to the minimum velocity divided by twice the maximum frequency.

In a more preferred embodiment of this invention, the constant $\beta$ in Equation I is calculated by using linear regression to determine the slope of a plot of z versus $\log_e A(z)$, where $A(z)$ is determined by solving Equation II:

$$A(z) = 2D\Delta c - \tfrac{1}{2}(\Delta c)^2 - r\Delta c \frac{D-z}{2D-z} + D\Delta c \log_e \qquad (II)$$

-continued $$\left[ \frac{(2D-z)D}{(D-z)r + (2D-z)\Delta c} \right] +$$

$$rD \frac{D-z}{2D-z} \log_e \left[ \frac{r(D-z)r}{r(D-z)r + (2D-z)\Delta c} \right]$$

for a series of values of $z = (')(n)$. The variable Z' is the initial depth interval used in Equation 1 and n is an integer. Of necessity, z is less than or equal to the depth of the wellbore. The variable r is set equal to r', where r is an initial surface offset interval also based on aliasing considerations. D, indicated at 18 FIGURE 1, is the depth to a reflector being imaged, and $\Delta c$ is a CDP increment, which may be chosen to be r' or r'/2.

In a most preferred embodiment of this invention, the seismic sources are positioned at a plurality of distances, r, indicated by 20 in FIG. 1, and the seismic receivers are positioned at a plurality of depths, z, indicated at 8 in FIG. 1, such that the plurality of distances, r, and the plurality of depths, z, which are available for mapping a reflector at depth, D, are grouped into CDP radial offset bins. CDP radial offset bins are sets of data that represent a common depth point on a reflector being mapped. In the most preferred emobodiment of this invention, the plurality of distances, r, and the plurality of depths, z, are grouped into CDP radial offset bins according to the Equation III:

$$r_{CDP} = \frac{(D-z)r}{2D-z} \qquad (III)$$

In this equation, $r_{CDP}$, indicated at 22 in FIG. 1, is a distance measured radially from an axis running vertically through the wellbore, indicated by 24 in FIG. 1, to a common depth point, indicated at 26 in FIG. 1, on the reflector being mapped, indicated at 14 in FIG. 1. The variable r is measured from the surface intercept of the wellbore, indicated at 12, to the position of a seismic source at or near the surface of the earth. The depth z is measured from the surface intercept of the wellbore to the position in the wellbore of a seismic receiver. Of necessity, in shooting reflection seismic, the variety of depths, z, and the variety of surface offsets, r, which may be employed are limited by the constraint that an angle $\theta$, indicated at 28 on FIG. 1, must be $\leq 45°$. The depth, z, must be less than or equal to the reflector depth D, and the surface offset, r, will be less than or equal to twice the reflector depth, D. D is measured from the surface of the earth, along a perpendicular to said surface, to the reflector, indicated at 14 in FIG. 1.

Figure 3:
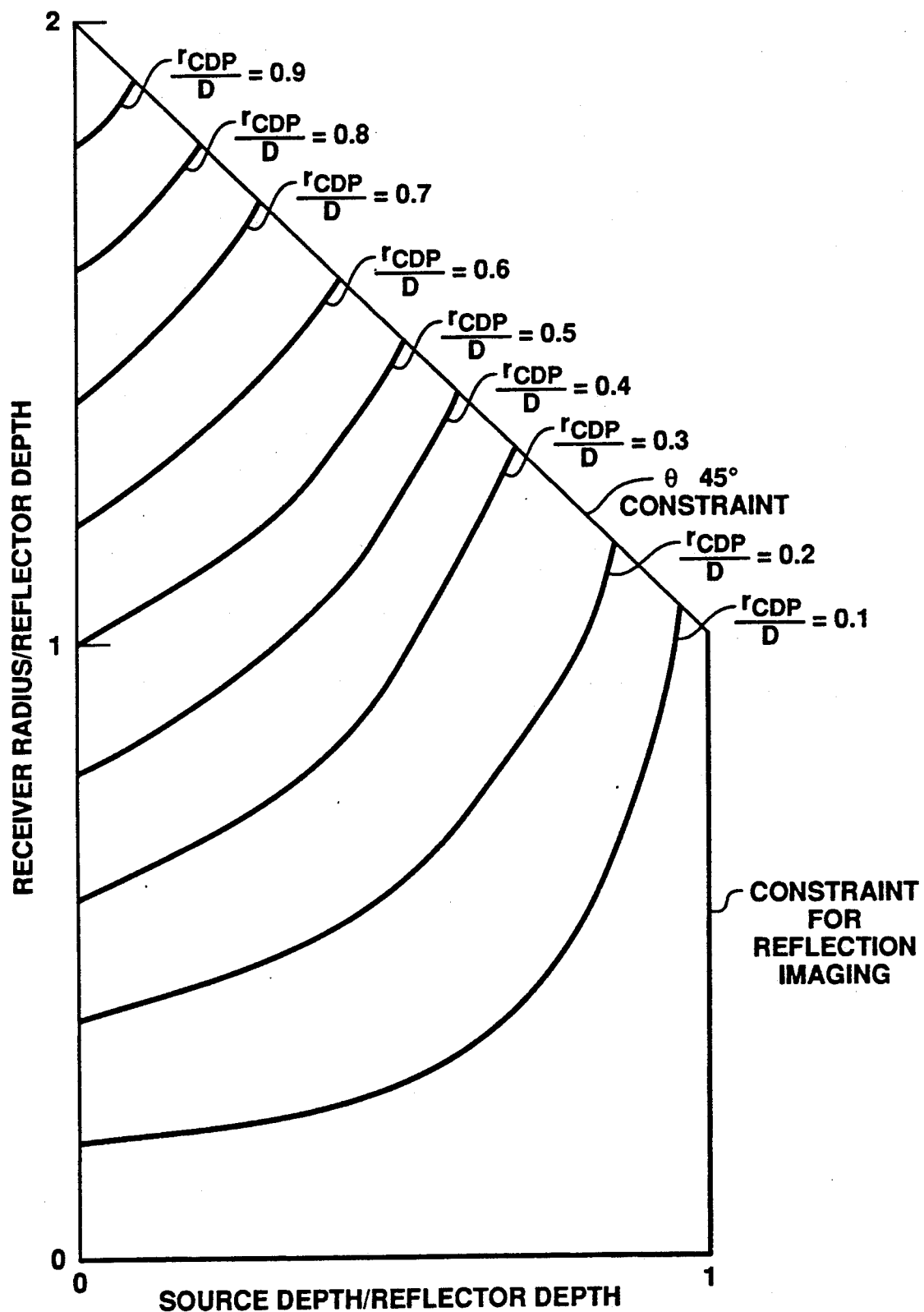
FIG. 3 illustrates graphically a division of the available points in the surface offset (r) and depth (z) plane into CDP bins. The borders of this figure represent constraints imposed by reflection imaging.

FIG. 3 illustrates the division of available surface offset and depth positions into CDP bins. The example in FIG. 3 illustrates the situation where a reflector being surveyed lies at a depth of 10,000 feet in a constant velocity material, with a velocity of 8,000 feet per second. The borders of the diagram represent the constraints just discussed. Embodiments noted as most preferred provided the best flattening of CDP fold in experimental tests.

Another embodiment of the invention provides a system for sending and receiving seismic signals comprising a plurality of seismic receivers positioned in a wellbore, and a plurality of seismic sources, indicated at 30 in FIG. 1, placed along or near the surface of the earth, indicated at 32 in FIG. 1. In this system a first distance, $\Delta r$, indicated by 34 in FIG. 1, between a pair of adjacent seismic source positions, indicated at 36 and 38 in FIG. 1, decreases exponentially as a second distance, r, indicated at 20 in FIG. 1, measured from the closer of the pair of adjacent seismic sources, indicated at 36 in FIG. 1, to the surface intercept of the wellbore increases. Thus, in contrast to conventional VSP shooting, where source positions are located at equally-spaced intervals, the sources in this system are positioned increasingly closer together as one goes further from the surface intercept of the wellbore. The receivers in this system may be positioned at any locations in the wellbore.

In a preferred embodiment of this invention, seismic sources in this system are positioned such that a distribution of CDP fold recorded by the system is substantially equalized across a reflector surveyed.

A more preferred embodiment of the invention provides that the plurality of seismic sources, indicated at 30 in FIG. 1, are positioned such that Equation IV is satisfied:

$$\Delta r = (r')(e^{-\alpha r}) \qquad (IV)$$

In this equation, $\Delta r$ is a first distance, indicated at 34 in FIG. 1, measured between a pair of adjacent seismic source positions, r is a second distance, indicated 20 in FIG. 1, measured from the closer of the pair of adjacent seismic source positions to the surface intercept of wellbore, indicated at 12 in FIG. 1, and r' is an initial surface spacing interval based on aliasing considerations known in the art. The variable r' must be less than or equal to 2 D, $\alpha$ is a constant, and e is a constant approximately equal to 2.718.

In a more preferred embodiment of the invention, $\alpha$ is calculated by using linear regression to determine the slope of a plot of r versus $\log_e A(r)$, where A(r) is determined by solving Equation V for values of r:

$$A(r) = 2D\Delta c - \tfrac{1}{2}(\Delta c)^2 - r\Delta c \frac{D-z}{2D-z} + D\Delta c \log_e \qquad (V)$$

$$\left[ \frac{D(2D-z)}{r(D-z)r + \Delta c(2D-z)} \right] +$$

$$rD \frac{D-z}{2D-z} \log_e \left[ \frac{r(D-z)}{r(D-z) + \Delta c(2D-z)} \right]$$

The depth of the seismic receivers, z, as indicated at 8 in FIG. 1, is held equal to zero, and the equation is solved for a series of values for r equal to n(r'), where n is an integer, and r' is the initial surface spacing interval used in Equation IV. D is a depth to a reflector, indicated by 18 in FIG. 1, and $\Delta c$ is a CDP increment, chosen to be either r' or r'/2.

A most preferred embodiment of this invention provides that the seismic receivers are positioned at a plurality of depths, z, indicated at 8 in FIG. 1, and the seismic sources, are positioned at a plurality of distances, r, indicated at 20 in FIG. 1 such that the plurality of depths, z, and the plurality of distances, r, which are available for mapping a reflector at depth, D, indicated at 18 in FIG. 1, are grouped into CDP radial offset bins according to Equation III. CDP radial offset bins are sets of data that are treated as representing a common depth point on the reflector being mapped. In this instance, $r_{CDP}$, indicated at 22 in FIG. 1, is a distance measured radially from an axis running vertically through the source or receiver of interest in the wellbore, indicated at 24 in FIG. 1, to a common depth point, indicated at 26 in FIG. 1, on the reflector being mapped. The quantity r is measured from the surface intercept of the axis, usually corresponding to the surface intercept of the wellbore, indicated at 12, to the position of a seismic source at or near the surface of the earth. The depth z is measured from the surface intercept of the wellbore to the position in the wellbore of a seismic receiver. Of necessity, in shooting reflection seismic, the variety of depths, z, and the variety of surface offsets, r, which may be employed are limited by the constraint that an angle $\theta$, indicated at 28 on FIG. 1, must be $\leq 45°$. The depth, z, must be less than or equal to the reflector depth D, and surface offset, r, will be less than or equal to twice the reflector depth, D. D is measured from this surface of the earth, along a perpendicular to said surface, to the reflector, indicated at 14 in FIG. 1.

FIG. 3 illustrates the division of available surface offsets, r, and depths, z, into CDP bins for an example in which the reflector of interest lies at a depth of 10,000 feet, and in which the material through which the seismic waves pass has a constant velocity of 8,000 feet per second. The borders of this diagram represent the constraints just discussed.

Figure 2:
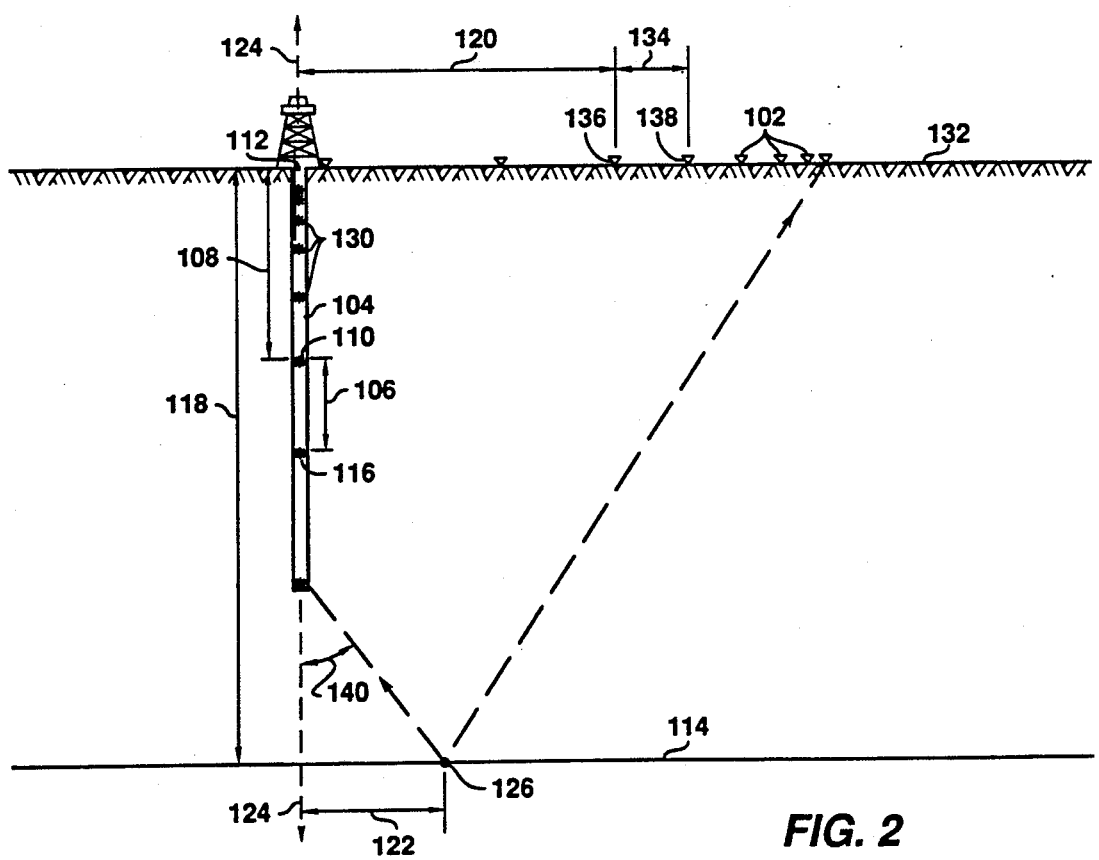
FIG. 2 illustrates pictorially the basic components of a reverse vertical seismic profile, with sources and receivers positioned as taught by this invention.

Another embodiment of the invention provides a system for sending and receiving seismic signals comprising seismic sources positioned in a wellbore and seismic receivers, indicated at 102 in FIG. 2, positioned along or near the surface of the earth, indicated at 132 in FIG. 2. A first distance, $\Delta r$, indicated at 134 in FIGURE 2, measured between a pair of adjace*t seismic receivers, indicated at 136 and 138 in FIG. 2, decreases exponentially as a second distance, r, indicated at 120 in FIG. 2, from the closer of the pair of adjacent seismic receivers, indicated at 136 in FIG. 2, to the surface intercept of the wellbore, indicated at 112 in FIG. 2, increases.

In a more preferred embodiment of the invention, the seismic receivers are positioned such that a distribution of CDP fold recorded by the system is substantially equalized across a reflector surveyed. An example of a reflector surveyed is indicated by 114 in FIG. 2.

In a more preferred embodiment of the invention, the seismic receivers are positioned such that Equation IV is satisfied. $\Delta r$ is the first distance, indicated at 134 in FIG. 2, measured between a pair of adjacent seismic receivers, indicated at 136 and 138 in FIG. 2. The variable r is the second distance, indicated at 120 in FIG. 2, measured from the closer of the pair of adjacent seismic receivers, indicated at 136 in FIG. 2, to the surface intercept of the wellbore, indicated at 112 in FIG. 2. The variable r' is an initial surface spacing interval based on aliasing considerations known in the art, $\alpha$ is a constant, and e is a constant approximately equal to 2.718.

In a more preferred embodiment of the invention, $\alpha$ is calculated by using linear regression to determine the slope of a plot of r versus $\log_e A(r)$, where A(r) is determined by solving Equation V for values of r equal to n(r'). The variable n is an integer, and r' is the initial surface spacing interval used in the above equation. In solving this equation, the depth of the seismic receivers, z, as indicated at 8 in FIG. 1, is held equal to zero. D is a depth to a reflector, indicated by 18 in FIG. 1, and Ac is a CDP increment, chosen to be either r' or r'/2.

A most preferred embodiment of the invention provides that the seismic sources are positioned at a plurality of depths, z, indicated 108 in FIG. 2, and the seismic receivers are positioned at a plurality of distances, r, indicated at 120 in FIG. 2, such that the plurality of depths, z, and the plurality of distances, r, which are available for mapping a reflector at a depth, D, are grouped into CDP radial offset bins according to Equation III. CDP radial offset bins are sets of data that are treated as representing a common depth point on the reflector being mapped. In this instance $r_{CDP}$ is a distance, indicated at 122 in FIG. 2, measured radially from an axis running vertically through the wellbore, indicated at 124 in FIG. 2, to a common depth point, indicated at 126 in FIG. 2, on a reflector being mapped, indicated at 114 on FIG. 2. The distance r is measured from the surface intercept of the wellbore, indicated at 112, to the position of a seismic receiver at or near the surface of the earth. The depth z is measured from the surface intercept of the wellbore to the position in the wellbore of a seismic source.

FIG. 3 illustrates the division of available surface offsets, r, and depths, Z, into CDP bins for an example in which the reflector of interest lies at a depth of 10,000 feet, and in which the material through which the seismic waves pass has a constant velocity of 8,000 feet per second. Again, in reflection shooting, the available r and z positions are limited by the constraint that an angle $\theta$, indicated at 140 on FIG. 2, must be less than or equal to 45°. The depths, z, must be less than or equal to the reflector depth D, indicated at 118 on FIG. 2, and the surface offsets, r, indicated at 120 on FIG. 2, must be less than or equal to twice the reflector depth D. The borders of FIG. 3 represent these constraints.

Another preferred embodiment of the invention provides a system for sending and receiving seismic signals comprising a plurality of seismic receivers positioned at or near the surface of the earth and a plurality of seismic sources, indicated at 130 in FIG. 2, are positioned in a wellbore, indicated at 104 in FIG. 2. A first distance, $\Delta z$, indicated at 106 in FIG. 2, between a pair of adjacent seismic source positions increases exponentially as a second distance, z, indicated at 108 in FIG. 2, measured from the closer of the pair of adjacent seismic source positions, indicated at 110 in FIG. 2, to the surface intercept of the wellbore, indicated at 112 in FIG. 2, increases.

In a preferred embodiment of the invention, sources are positioned such that a distribution of CDP fold recorded by the system is substantially equalized across a reflector surveyed.

A more preferred embodiment of the invention provides that the seismic sources indicated at 130 in FIG. 2, are positioned such that Equation I is satisfied. In this instance, $\Delta z$, indicated at 106 in FIG. 2, is a first distance, measured between a pair of adjacent seismic sources, indicated at 110 and 116 in FIG. 2. The depth z, indicated at 108 in FIG. 2, is a second distance, less than or equal to the total depth of the wellbore and measured from the closer of the pair of adjacent seismic receivers, indicated at 110 in FIG. 2, to the surface intercept of the wellbore, $\beta$ is a constant, z' is an initial depth data spacing interval based on aliasing considerations known in the art, and e is a constant approximately equal to 2.718.

In a more preferred embodiment of this invention, the constant $\beta$ in the above equation is calculated by using linear regression to determine the slope of a plot of z versus $\log_e A(z)$, where A(z) is determined by solving Equation II for a series of values of z less than or equal to the depth of the wellbore, where z = (')(n). The variable 'is the initial depth interval used in Equation I, and n is an integer. In solving this equation, r is held equal to r', an initial surface offset interval based on aliasing consideration, D, indicated at 118 FIG. 2, is a depth to a reflector, and $\Delta c$ is a CDP increment, which may be chosen to be r' or r' /2.

A most preferred embodiment of the invention provides that the receivers and sources are positioned such that the depths, z, and distances, r, which are available for mapping a reflector at depth, D, are grouped into CDP radial offset bins according to Equation III. In this instance, $r_{CDP}$, indicated at 122 in FIG. 2, is a distance measured radially from an axis running vertically through the wellbore, indicated at 124 in FIG. 2, to a common depth point on a reflector being mapped, indicated at 126 in FIG. 2. The distance r is measured from the surface intercept of the wellbore, indicated at 112 to the position of a seismic receiver at or near the surface of the earth. The variable z is measured from the surface intercept of the wellbore to the position in the wellbore of a seismic source.

Figure 4:
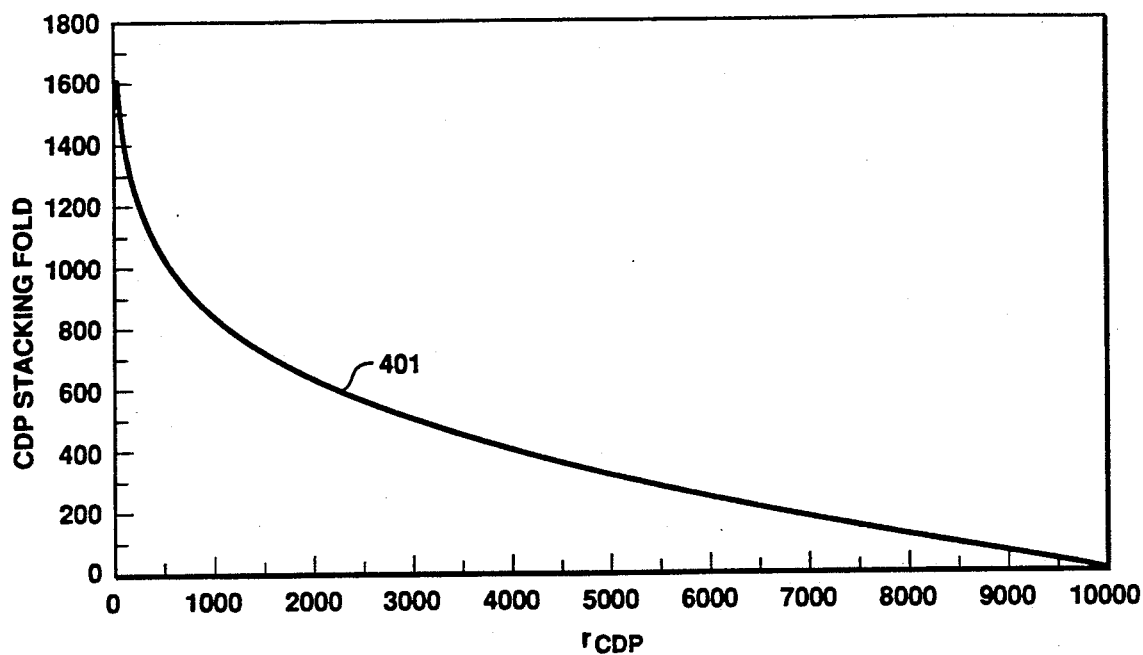
FIG. 4 (Prior Art) This figure graphically illustrates the distribution of CDP stacking fold for a range of CDP offset radii, $r_{CDP}$, for an example in which the target reflector is located at a depth of 10,000 ft. (3,050 meters). Line 401 illustrates the distribution of fold for conventional VSP shooting, with equally-spaced source and receiver positions.
Figure 5:
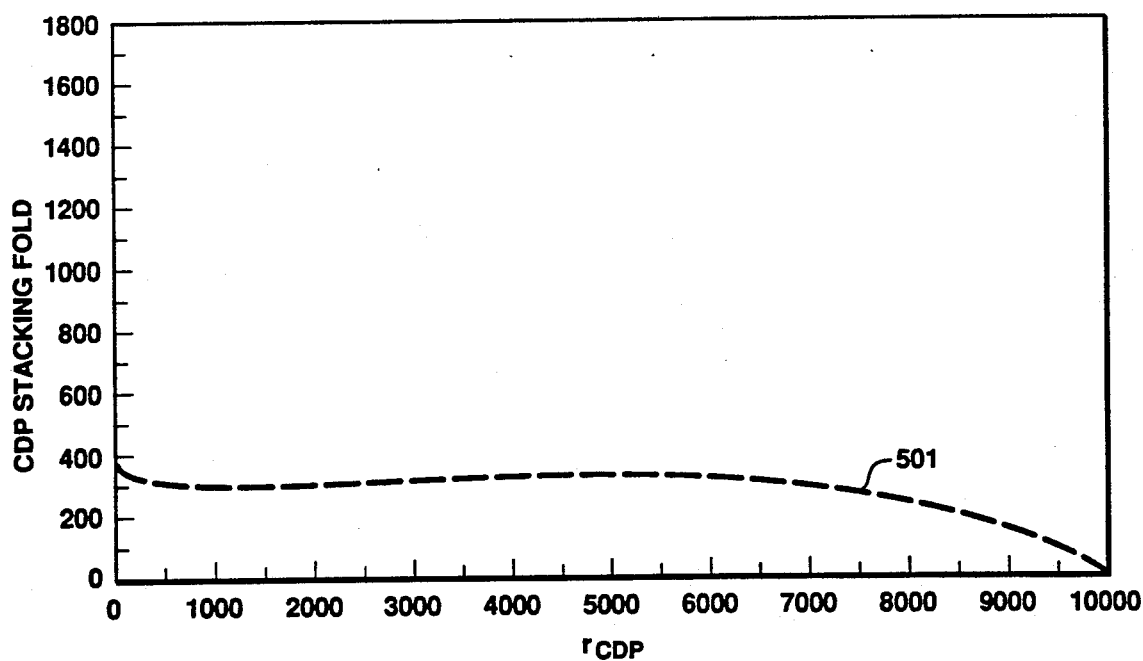
FIG. 5 graphically illustrates the distribution of CDP stacking fold for a range of CDP offset radii, $r_{CDP}$, for an example in which the target reflector is located at the same depth as in FIG. 4. Line 501 illustrates the improvement achieved by this invention, wherein the source and receiver were positioned according to the most preferred embodiment of this invention, herein described.

FIGS. 1 and 2 illustrate positions of both sources and receivers that are positioned according to this invention. Positioning of sources and positioning of receivers may be practiced independently, however, and should result in data of more even fold than conventional spacing. FIG. 5 illustrates results for a 10,000 foot reflector, imaged through rock of a constant velocity, positioning both seismic sources and receivers as taught by the invention. FIG. 4 illustrates results obtained for the same conditions using conventional positioning. Curve 401 illustrates the extreme drop off of CDP stacking fold under conventional VSP spacing, and curve 501 in FIG. 5 illustrates the results achieved through use of this system.

The computer program contained in Table I, written in FORTRAN, illustrates one preferred embodiment of the invention.

What is claimed is:

1. A system for sending and receiving seismic signals, which comprises:
   a. a plurality of seismic sources positioned along or near the surface of the earth; and
   b. a plurality of seismic receivers positioned in a wellbore, said plurality of seismic receivers being positioned so that a first distance between a pair of adjacent seismic receivers increases exponentially as a second distance from the closer of the pair of adjacent seismic receivers to the intercept of the wellbore with the surface increases.

2. A system for sending and receiving seismic signals, as recited in claim 1, wherein the plurality of seismic receivers are positioned such that a distribution of CDP fold recorded by the system is substantially equalized across a reflector surveyed.

3. A system for sending and receiving seismic signals, as recited in claim 2, wherein:
   the plurality of seismic receivers are positioned such that equation:

$$\Delta z = (e^{\beta z})(z')$$

is satisfied, wherein $\Delta z$ is the first distance, z is the second distance, z' is a predetermined value representing an initial depth interval based on aliasing considerations, $\beta$ is a constant, and e is a constant approximately equal to 2.718.

4. A system for sending and receiving seismic signals, as recited in claim 3, wherein:

$\beta$ is calculated by using linear regression to determine the slope of a plot of z, $\log_e A(z)$, where A(z) is determined by solving the equation:

$$A(z) = 2D\Delta c - \tfrac{1}{2}(\Delta c)^2 - r\Delta c \frac{D-z}{2D-z} + D\Delta c \log_e \left[ \frac{(2D-z)D}{(D-z)r + (2D-z)\Delta c} \right] +$$

$$rD\frac{D-z}{2D-z}\log_e\left[\frac{(D-z)r}{(D-z)r + (2D-z)\Delta c}\right]$$

for values of $z = n(')$, where $z \leq D$, n is an integer, z' is an initial depth interval based on aliasing considerations, D is a depth to a reflector being surveyed; $\Delta c$ represents a CDP increment, chosen to be either ' or '/2, r is set equal to r' and r' is an initial surface offset interval based on aliasing considerations.

5. A system for sending and receiving seismic signals, as recited in claim 4, wherein:

the plurality of seismic sources are positioned at a plurality of distances, r, measured from the surface intercept of the wellbore to the position of a seismic source at or near the surface of the earth, and the plurality of seismic receivers are positioned at a plurality of depths, z, in the wellbore, measured from the surface intercept of the wellbore to a position in the wellbore of a seismic receiver, such that the plurality of distances, r, and the plurality of depths, z, which are available for mapping a reflector at depth, D, measured from the surface of the earth, along a perpendicular to said surface, to the reflector, are grouped into CDP radial offset bins according to the equation:

$$r_{CDP} = \frac{(D-z)r}{2D-z}$$

in which $r_{CDP}$ is a distance measured radially from an axis running vertically through the wellbore to a common depth point on a reflector being mapped, and CDP radial offset bins are sets of data that are treated as representing a common depth point on the reflector being mapped.

6. A system for sending and receiving seismic signals, which comprises:

a. a plurality of seismic receivers placed in a wellbore; and b. a plurality of seismic sources placed along or near the surface of the earth, said plurality of seismic sources being positioned so that a first distance between a pair of adjacent seismic source positions decreases exponentially as a second distance from the closer of the pair of adjacent seismic sources positions to the intercept of the wellbore with the surface increases.

7. A system for sending and receiving seismic signals, as recited in claim 6, wherein the plurality of seismic sources are positioned such that a distribution of CDP fold recorded by the system is substantially equalized across a reflector surveyed.

8. A system for sending and receiving seismic signals, as recited in claim 7, wherein:

the plurality of seismic sources are positioned such that equation:

$$\Delta r = (r')(e^{-ar})$$

is satisfied, wherein $\Delta r$ is the first distance, r is the second distance, r' is a predetermined value representing an initial surface offset interval based on aliasing considerations, $\alpha$ is a constant, and e is a constant approximately equal to 2.718.

9. A system for sending and receiving seismic signals, as recited in claim 8, wherein:

$\alpha$ is calculated by using linear regression to determine the slope of a plot of r, $\log_e A(r)$, where A(r) is determined by solving the equation:

$$A(r) = 2D\Delta c - \tfrac{1}{2}(\Delta c)^2 - r\Delta c \frac{D-z}{2D-z} + D\Delta c \log_e \left[ \frac{D(2D-z)}{r(D-z) + \Delta c(2D-z)} \right] +$$

$$rD\frac{D-z}{2D-z}\log_e\left[\frac{(D-z)r}{(D-z)r + \Delta c(2D-z)}\right]$$

for values of $r = n(r')$, where $r \leq 2D$, n is an integer, and r' is the initial surface offset interval based on aliasing considerations, Z is set equal to zero, D is a depth to a reflector being surveyed; and $\Delta c$ represents a CDP increment, chosen to be either r' or r'/2.

10. A system for sending and receiving seismic signals, as recited in claim 9, wherein:

the plurality of seismic receivers are positioned at a plurality of depths, z, in the wellbore, measured from the surface intercept of the wellbore to a position in the wellbore of a seismic receiver and the plurality of seismicssources are positioned at a plurality of distances, r, measured from the surface intercept of the wellbore to a position of a seismic source at or near the surface of the earth, such that the plurality of depths, z, and the plurality of distances, r, which are available for mapping a reflector at depth, D, measured from the surface of the earth, along a perpendicular to said surface, to the reflector, are grouped into CDP radial offset bins according to the equation:

$$r_{CDP} = \frac{(D-z)r}{2D-z}$$

in which $r_{CDP}$ is a distance measured radially from an axis running vertically through the wellbore to a common depth point on a reflector being mapped, and CDP radial offset bins are sets of data that are treated as representing a common depth point on the reflector being mapped.

11. A system for sending and receiving seismic signals, which comprises:

a. a plurality of seismic sources positioned in a wellbore; and b. a plurality of seismic receivers positioned along or near the surface of the earth, said plurality of seismic receivers being positioned so that a first distance between a pair of adjacent seismic receivers decreases exponentially as a second distance from the closer of the pair of adjacent seismic receivers to the intercept of the wellbore with the surface increases.

12. A system for sending and receiving seismic signals, as recited in claim 11, wherein the plurality of seismic receivers are positioned such that a distribution of CDP fold recorded by the system is substantially equalized across a reflector surveyed.

13. A system for sending and receiving seismic signals, as recited in claim 12, wherein:
the plurality of seismic receivers are positioned such that equation:

$$\Delta r = (e^{-\alpha r})(r')$$

is satisfied, wherein $\Delta r$ is the first distance, r is the second distance, r' is an initial surface offset interval based on aliasing considerations, $\alpha$ is a constant, and e is a constant approximately equal to 2.718.

14. A system for sending and receiving seismic signals, as recited in claim 13, wherein:
$\alpha$ is calculated by using linear regression to determine the slope of a plot of r, $\log_e A(r)$, where A(r) is determined by solving the equation:

$$A(r) = 2D\Delta c - \frac{1}{2}(\Delta c)^2 - r\Delta c \frac{D-z}{2D-z} + D\Delta c \log_e$$

$$\left[\frac{(2D-z)D}{(D-z)r + (2D-z)\Delta c}\right] +$$

$$rD \frac{D-z}{2D-z} \log_e \left[\frac{(D-z)r}{(D-z)r + (2D-z)\Delta c}\right]$$

initial surface offset interval based on aliasing considerations, z is set equal to zero, D is a depth to a reflector being surveyed; and $\Delta c$ represents a CDP increment, chosen to be either r' or r'/2.

15. A system for sending and receiving seismic signals, as recited in claim 14, wherein:
the plurality of seismic sources are positioned at a plurality of depths, z, in the wellbore, measured from the surface intercept of the wellbore to a position in the wellbore of a seismic source, and the plurality of seismic receivers are positioned at a plurality of distances, r, measured from the surface intercept of the wellbore to a position, at or near the surface of the earth, of a seismic receiver, such that the plurality of depths, z, and the plurality of distances, r, which are available for mapping a reflector at a depth, D, measured from the surface of the earth, along a perpendicular to said surface, to the reflector, are grouped into CDP radial offset bins according to the equation:

$$r_{CDP} = \frac{(D-z)r}{2D-z}$$

in which $r_{CDP}$ is a distance measured radially from an axis running vertically through the wellbore to a common depth point on a reflector being mapped, and CDP radial offset bins are sets of data that are treated as representing a common depth point on the reflector being mapped.

16. A system for sending and receiving seismic signals, which comprises:

a. a plurality of seismic receivers positioned at or near the surface of the earth; and
b. a plurality of seismic sources positioned in a wellbore, said plurality of seismic receivers being positioned so that a first distance between a pair of adjacent seismic source positions increases exponentially as a second distance from the closer of the pair of adjacent seismic source positions to the intercept of the wellbore with the surface increases.

17. A system for sending and receiving seismic signals, as recited in claim 16, wherein the plurality of seismic sources are positioned such that a distribution of CDP fold recorded by the system is substantially equalized across a reflector surveyed.

18. A system for sending and receiving seismic signals, as recited in claim 17, wherein:
the plurality of seismic sources are positioned such that equation:

$$\Delta z = (e^{\beta z})(z')$$

is satisfied, wherein $\Delta z$ is the first distance, z is a second distance, ' is a predetermined value representing an initial depth interval based on aliasing considerations, $\alpha$ is a constant, and e is a constant approximately equal to 2.718.

19. A system for sending and receiving seismic signals, as recited in claim 18, wherein:
$\beta$ is calculated by using linear regression to determine the slope of a plot of z, $\log_e A(z)$, where A(z) is determined by solving the equation:

$$A(z) = 2D\Delta c - \frac{1}{2}(\Delta c)^2 - r\Delta c \frac{D-z}{2D-z} + D\Delta c \log_e$$

$$\left[\frac{D(2D-z)}{r(D-z) + \Delta c(2D-z)}\right] +$$

$$rD \frac{D-z}{2D-z} \log_e \left[\frac{(D-z)r}{(D-z)r + \Delta c(2D-z)}\right]$$

for values of z=n('), where $z \leq D$, n is an integer, z' is the initial depth interval based on aliasing considerations, D is a depth to a reflector being surveyed; $\Delta c$ represents a CDP increment, chosen to be either z' or z'/2, r is set equal to r', and r' is an initial surface offset interval based on aliasing considerations.

20. A system for sending and receiving seismic signals, as recited in claim 19, wherein:
the plurality of seismic receivers are positioned at a plurality of distances, r, measured from the surface intercept of the wellbore t a position of seismic receiver at or near the surface of the earth, and the plurality of seismic sources are positioned at a plurality of depths, z, in the wellbore, measured from the surface intercept of the wellbore to a position in the wellbore of a seismic source, such that the plurality of distances, r, and the plurality of depths, z, which are available for mapping a reflector at depth, D, measured from the surface of the earth, along a perpendicular to said surface, to the reflector, are grouped into CDP radial offset bins according to the equation:

$$r_{CDP} = \frac{(D - z)r}{2D - z}$$

in which $r_{CDP}$ is a distance measured radially from an axis running vertically through the wellbore to a common depth point on a reflector being mapped, and CDP radial offset bins are sets of data that are treated as representing a common depth point on the reflector being mapped.

21. A method of positioning a plurality of seismic receivers in a wellbore, such that a first distance, measured between a pair of adjacent seismic receivers, increases exponentially as a second distance, measured from the closer of the pair of adjacent seismic receivers to the surface intercept of the wellbore, increases.

22. A method of positioning a plurality of seismic receivers, as recited in claim 21, so that a resulting distribution of CDP fold is substantially equalized across a reflector surveyed.

23. A method of positioning the plurality of seismic receivers, as recited in claim 22, wherein: the plurality of seismic receivers is positioned such that equation:

$$\Delta z = (e^{\beta z})(z')$$

is satisfied, wherein $\Delta z$ is the first distance, z is a second distance, z' is an initial depth interval based on aliasing considerations, $\beta$ is a constant, and e is a constant approximately equal to 2.718.

24. A method for positioning the plurality of seismic receivers, as recited in claim 23, wherein:

$\beta$ is calculated by using linear regression to determine the slope of a plot of z, $\log_e A(z)$, where $A(z)$ is determined by solving the equation:

$$A(z) = 2D\Delta c - \frac{1}{2}(\Delta c)^2 - r\Delta c \frac{D-z}{2D-z} + D\Delta c \log_e \left[ \frac{(2D-z)D}{(D-z)r + (2D-z)\Delta c} \right] +$$

$$rD \frac{D-z}{2D-z} \log_e \left[ \frac{(D-z)r}{(D-z)r + (2D-z)\Delta c} \right]$$

for values of $z = n(')$, where $z \leq D$, n is an integer, z' is the initial depth interval based on aliasing considerations, D is a depth to a reflector being surveyed; $\Delta c$ represents a CDP increment, chosen to be either ' or '/2, r is set equal to r', and r' is an initial surface offset interval based on aliasing considerations.

25. A method of positioning the plurality of seismic receivers, as recited in claim 24, wherein:

the plurality of seismic receivers are positioned at a plurality of depths, z, in the wellbore, measured from the surface intercept of the wellbore to a position in the wellbore of a seismic receiver, and a plurality of seismic sources are positioned at a plurality of distances, r, measured from the surface intercept of the wellbore to a position, at or near the surface of the earth, of a seismic source, such that the plurality of depths, z, and the plurality of distances, r, which are available for mapping a reflector at depth, D, measured from the surface of the earth, along a perpendicular to said surface, to the reflector, are grouped into CDP radial offset bins according to the equation:

$$r_{CDP} = \frac{(D - z)r}{2D - z}$$

in which $r_{CDP}$ is a distance measured radially from an axis running vertically through the wellbore to a common depth point on the reflector being mapped, and CDP radial offset bins are sets of data that are treated as representing a common depth point on the reflector being mapped.

26. A method of positioning a plurality of seismic sources along or near the surface of the earth, such that a first distance, measured between a pair of adjacent seismic source positions, decreases exponentially as a second distance, measured from the closer of the pair of adjacent seismic source positions to the surface intercept of the wellbore, increases.

27. A method of positioning a plurality of seismic sources, as recited in claim 26, so that a resulting distribution of CDP fold is substantially equalized across a reflector surveyed.

28. A method of positioning the plurality of seismic sources, as recited in claim 27, wherein:

the plurality of seismic sources is positioned such that equation:

$$\Delta r = (e^{-\alpha r})(r')$$

is satisfied, wherein $\Delta r$ is the first distance. r is the second distance. r' is an initial surface offset interval based on aliasing considerations, $\alpha$ is a constant, and e is a constant approximately equal to 2.718.

29. A method of positioning the plurality of seismic sources, as recited in claim 28, wherein:

$\alpha$ is calculated by using linear regression to determine the slope of a plot of r, $\log_e A(r)$, where $A(r)$ is determined by solving the equation:

$$A(r) = 2D\Delta c - \frac{1}{2}(\Delta c)^2 - r\Delta c \frac{D-z}{2D-z} + D\Delta c \log_e \left[ \frac{D(2D-z)}{r(D-z) + \Delta c(2D-z)} \right] +$$

$$rD \frac{D-z}{2D-z} \log_e \left[ \frac{(D-z)r}{(D-z)r + \Delta c(2D-z)} \right]$$

for values of $r = n(r')$, where $r \leq 2D$, n is an integer, and r' is the initial surface offset interval based on aliasing considerations, z is set equal to zero, D is a depth to a reflector being surveyed; and $\Delta c$ represents a CDP increment, chosen to be either r' or 2.

30. A method of positioning the plurality of seismic sources, as recited in claim 29, wherein:

the plurality of seismic sources are positioned at a plurality of distances, r, measured from the surface intercept of the wellbore to a position of a seismic source at or near the surface of the earth, and a plurality of seismic receivers are positioned at a plurality of depths, z, in the wellbore, measured from the surface intercept of the wellbore to a position in the wellbore of a seismic receiver, such that the plurality of distances, r, and the plurality of depths, z, which are available for mapping a reflector at depth, D, measured from the surface of the earth along a perpendicular to said surface, to the reflector, are grouped into CDP radial offset bins according to the equation:

$$r_{CDP} = \frac{(D-z)r}{2D-z}$$

in which $r_{CDP}$ is a distance measured radially from an axis running vertically through the wellbore to a common depth point on the reflector being mapped, and CDP radial offset bins are sets of data that are treated as representing a common depth point on the reflector being mapped.

31. A method of positioning a plurality of seismic sources in a wellbore, such that a first distance, measured between a pair of adjacent seismic source positions, increases exponentially as a second distance, measured from the closer of the pair of the adjacent seismic source positions to the surface intercept of the wellbore, increases.

32. A method of positioning a plurality of seismic sources, as recited in claim 31, so that a resulting distribution of CDP fold is substantially equalized across a reflector surveyed.

33. A method of positioning the plurality of seismic sources, as recited in claim 32, wherein:
the plurality of seismic sources is positioned such that equation:

$$\Delta z = (e^{\beta z})(z')$$

is satisfied, wherein $\Delta z$ is the first distance, z is the second distance, z' is a predetermined value representing an initial depth interval based on aliasing considerations, $\beta$ is a constant, and e is a constant approximately equal to 2.718.

34. A method for positioning the plurality of seismic receivers, as recited in claim 33, wherein:
$\beta$ is calculated by using linear regression to determine the slope of a plot of z, $\log_e A(z)$, where A(z) is determined by solving the equation:

$$A(z) = 2D\Delta c - \frac{1}{2}(\Delta c)^2 - r\Delta c \frac{D-z}{2D-z} + D\Delta c \log_e \left[\frac{(2D-z)D}{(D-z)r + (2D-z)\Delta c}\right] +$$

$$rD\frac{D-z}{2D-z} \log_e \left[\frac{(D-z)r}{(D-z)r + (2D-z)\Delta c}\right]$$

for values of z = n('), where z ≤ D, n is an integer, z' is the initial depth interval based on aliasing considerations, D is a depth to a reflector being surveyed; $\Delta c$ represents a CDP increment, chosen to be either z' or z'/2, r is set equal to r', and r' is an initial surface offset interval based on aliasing considerations.

35. A method of positioning the plurality of seismic sources, as recited in claim 34, wherein:
the plurality of seismic sources are positioned at a plurality of depths, z, in the wellbore, measured from the surface intercept of the wellbore to a position in the wellbore of a seismic source, and a plurality of seismic receivers are positioned at a plurality of distances, r, measured from the surface intercept of the wellbore to a position, at or near the surface of the earth, of a seismic receiver, such that the plurality of depths, z, and the plurality of distances, r, which are available for mapping a reflector at depth, D, measured from the surface of the earth, along a perpendicular to said surface, to the reflector, are grouped into CDP radial offset bins according to the equation:

$$r_{CDP} = \frac{(D-z)r}{2D-z}$$

in which $r_{CDP}$ is a distance measured radially from an axis running vertically through the wellbore to a common depth point on the reflector being mapped, and CDP radial offset bins are sets of data that are treated as representing a common depth point on the reflector being mapped.

36. A method of positioning a plurality of seismic receivers along or near the surface of the earth, such that a first distance, measured between a pair of adjacent seismic receivers, decreases exponentially as a second distance, measured from the closer of the pair of adjacent seismic receivers to the surface intercept of the wellbore increases.

37. A method of positioning a plurality of seismic receivers, as recited in claim 36, so that a resulting distribution of CDP fold is substantially equalized across a reflector surveyed.

38. A method of positioning the plurality of seismic receivers, as recited in claim 37, wherein:
the plurality of seismic receivers is positioned such that equation:

$$\Delta r = (e^{-\alpha r})(r')$$

is satisfied, wherein $\Delta r$ is the first distance, r is the second distance, r' is a predetermined value representing an initial surface offset interval based on aliasing considerations, $\alpha$ is a constant, and e is a constant approximately equal to 2.718.

39. A method of positioning the plurality of seismic sources, as recited in claim 38, wherein:
$\alpha$ is calculated by using linear regression to determine the slope of a plot of r, $\log_e A(r)$, where A(r) is determined by solving the equation:

$$A(r) = 2D\Delta c - \frac{1}{2}(\Delta c)^2 - r\Delta c \frac{D-z}{2D-z} + D\Delta c \log_e \left[\frac{D(2D-z)}{r(D-z) + \Delta c(2D-z)}\right] +$$

$$rD\frac{D-z}{2D-z} \log_e \left[\frac{(D-z)r}{(D-z)r + \Delta c(2D-z)}\right]$$

for values of r = n(r'), where r ≤ 2 D, n is an integer, r' is the initial surface offset interval based on aliasing considerations, Z is set equal to zero, D is a depth to a reflector being surveyed; and $\Delta c$ represents a CDP increment, chosen to be either r' or 2.

40. A method of positioning the plurality of seismic receivers, as recited in claim 39, wherein:
the plurality of seismic receivers are positioned at a plurality of distances, r, measured from the surface intercept of the wellbore to a position of a seismic receiver, at or near the surface of the earth, and a plurality of seismic sources are positioned at a plurality of depths, z, in the wellbore, measured from the surface intercept of the wellbore to a position in the wellbore of a seismic source such that the plurality of distances, r, and the plurality of depths, z, which are available for mapping a reflector at depth, D, measured from the surface of the earth along a perpendicular to said surface, to the reflector, are grouped into CDP radial offset bins according to the equation:

$$r_{CDP} = \frac{(D-z)r}{2D-z}$$

in which $r_{CDP}$ is a distance measured radially from an axis running vertically through the wellbore to a common depth point on the reflector being mapped, and CDP radial offset bins are sets of data that are treated as representing a common depth point on the reflector being.

41. A method for sending and receiving seismic signals, which comprises:
   a. sending a plurality of seismic signals from a plurality of seismic sources positioned in a wellbore;
   b. reflecting the plurality of seismic signals from a plurality of reflectors to form a plurality of reflected seismic signals;
   c. receiving the plurality of reflected seismic signals at a plurality of seismic receivers positioned along or near the surface of the earth, so that a first distance between a pair of adjacent seismic receivers decreases exponentially as a second distance from the closer of the pair of adjacent seismic receivers to the surface intercept of the wellbore increases; and
   d. recording the plurality of reflected seismic signals so received, wherein each plurality can be the same or different.

42. A method for sending and receiving seismic signals, as recited in claim 41, wherein the plurality of reflected seismic signals are received at a plurality of seismic receiver positions such that a distribution of CDP fold recorded by the system is substantially equalized across a reflector surveyed.

43. A method for sending and receiving seismic signals, as recited in claim 42, wherein:
   the plurality of seismic receivers are positioned such that equation:

$$\Delta r = (e^{-\alpha r})r'$$

is satisfied, wherein $\Delta r$ is the first distance, measured between a pair of adjacent seismic receivers, r is the second distance, measured from the closer of the pair of adjacent seismic receivers to the wellbore, r' is a predetermined value representing an initial spacing interval based on aliasing considerations, $\alpha$ is a constant, and e is a constant approximately equal to 2.718.

44. A method for sending and receiving seismic signals, as recited in claim 43, wherein:
   $\alpha$ is calculated by using linear regression to determine the slope of a plot of r, $\log_e A(r)$, where $A(r)$ is determined by solving the equation:

$$A(r) = 2D\Delta c - \tfrac{1}{2}(\Delta c)^2 - r\Delta c \frac{D-z}{2D-z} + D\Delta c \log_e$$

-continued $$\left[ \frac{(2D-z)D}{(D-z)r + (2D-z)\Delta c} \right] +$$

$$rD \frac{D-z}{2D-z} \log_e \left[ \frac{(D-z)r}{(D-z)r + (2D-z)\Delta c} \right]$$

for values of $r = n(r')$, where $r \leq 2D$, n is an integer, r' is the initial surface offset interval based on aliasing considerations, Z is set equal to zero, D is a depth to a reflector being surveyed; and $\Delta c$ represents a CDP increment, chosen to be either r' or 2.

45. A method for sending and receiving seismic signals, as recited in claim 44, wherein:
   the plurality of seismic sources are positioned at a plurality of depths, z, in the wellbore, measured from the surface intercept of the wellbore to a position in the wellbore of a seismic source, and the plurality of seismic receivers are positioned at a plurality of distances, r, measured from the surface intercept of the wellbore to a position, at or near the surface of the earth, of a seismic receiver, such that the plurality of depths, z, and the plurality of distances, r, which are available for mapping a reflector at a depth, D, measured from the surface of the earth, along a perpendicular to said surface, to the reflector, are grouped into CDP radial offset bins according to the equation:

$$r_{CDP} = \frac{(D-z)r}{2D-z}$$

in which $r_{CDP}$ is a distance measured radially from an axis running vertically through the wellbore to a common depth point on a reflector being mapped, and CDP radial offset bins are sets of data that are treated as representing a common depth point on the reflector being mapped.

46. A method for sending and receiving seismic signals, which comprises:
   a. sending a plurality of seismic signals from a plurality of seismic sources positioned in a wellbore, so that a first distance between a pair of adjacent seismic source positions increases exponentially as a second distance from the closer of the pair of adjacent seismic sources positions to the surface intercept of the wellbore increases to form a plurality of reflected seismic signals;
   b. reflecting signals from a plurality of reflectors;
   c. receiving the plurality of seismic signals at a plurality of seismic receivers positioned at or near the surface of the earth; and
   d. recording the plurality of reflected seismic signals so received, wherein each plurality can be the same or different.

47. A method for sending and receiving seismic signals, as recited in claim 46, wherein the plurality of seismic signals are generated from a plurality of seismic source positions such that a distribution of CDP fold recorded by the system is substantially equalized across a reflector surveyed.

48. A method for sending and receiving seismic signals, as recited in claim 47, wherein:
   the plurality of seismic sources are positioned such that equation:

$$\Delta z = (e^{\beta z})(z')$$

is satisfied, wherein $\Delta z$ is a first distance, measured between a pair of adjacent seismic source positions, z is a second distance, measured from the closer of the pair of adjacent seismic source positions to the surface intercept of the wellbore, 'is a predetermined value representing an initial depth interval based on aliasing considerations, $\beta$ is a constant, and e is a constant approximately equal to 2.718.

49. A method for sending and receiving seismic signals, as recited in claim 48, wherein:

$\beta$ is calculated by using linear regression to determine the slope of a plot of z, $\log_e A(z)$, where $A(z)$ is determined by solving the equation:

$$A(z) = 2D\Delta c - \tfrac{1}{2}(\Delta c)^2 - r\Delta c \frac{D-z}{2D-z} + D\Delta c \log_e$$

$$\left[ \frac{D(2D-z)}{r(D-z) + \Delta c(2D-z)} \right] +$$

$$rD \frac{D-z}{2D-z} \log_e \left[ \frac{(D-z)r}{(D-z)r + \Delta c(2D-z)} \right]$$

for values of $z = n(')$, where $z \leq D$, n is an integer, z' is an initial depth interval based on aliasing considerations, D is a depth to a reflector being surveyed; $\Delta c$ represents a CDP increment, chosen to be either z' or z'/2, r is set equal to r'; and r' is an initial surface offset interval based on aliasing considerations.

50. A method for sending and receiving seismic signals, as recited in claim 49, wherein:

the plurality of seismic receivers are positioned at a plurality of distances, r, measured from the surface intercept of the wellbore to a position of seismic receiver at or near the surface of the earth, and the plurality of seismic sources are positioned at a plurality of depths, z, in the wellbore, measured from the surface intercept of the wellbore to a position in the wellbore of a seismic source, such that the plurality of distances, r, and the plurality of depths, z, which are available for mapping a reflector at depth, D, measured from the surface of the earth, along a perpendicular to said surface, to the reflector, are grouped into CDP radial offset bins according to the equation:

$$r_{CDP} = \frac{(D-z)r}{2D-z}$$

in which $r_{CDP}$ is a distance measured radially from an axis running vertically through the wellbore to a common depth point on a reflector being mapped, and CDP radial offset bins are sets of data that are treated as representing a common depth point on the reflector being mapped.

51. A method for sending and receiving seismic signals, which comprises:

a. sending a plurality of seismic signals from a plurality of seismic sources positioned along or near the surface of the earth;

b. reflecting the plurality of seismic signals from a plurality of reflectors to form a plurality of reflected seismic signals;

c. receiving the plurality of reflected seismic signals at a plurality of seismic receivers positioned in a wellbore, so that a first distance between a pair of adjacent seismic receivers increases exponentially as a second distance from the closer of the pair of adjacent seismic receivers to the surface intercept of the wellbore increases; and d. recording the plurality of reflected seismic signals so received, wherein each plurality can be the same or different.

52. A method for sending and receiving seismic signals, as recited in claim 51, wherein the plurality of reflected seismic signals are received at a plurality of seismic receiver positions such that a distribution of CDP fold recorded by the system is substantially equalized across a reflector surveyed.

53. A method for sending and receiving seismic signals, as recited in claim 52, wherein:

the plurality of seismic receivers are positioned such that equation:

$$\Delta z = (e^{\beta z})(z')$$

is satisfied, wherein $\Delta z$ is a first distance, measured between a pair of adjacent seismic receivers, z is a second distance, measured from the closer of the pair of adjacent seismic receivers to the surface intercept of the wellbore, z' is a predetermined value representing an initial depth interval based on aliasing considerations, $\beta$ is a constant, and e is a constant approximately equal to 2.718.

54. A method for sending and receiving seismic signals, as recited in claim 53, wherein:

$\beta$ is calculated by using linear regression determine the slope of a plot of z, $\log_e A(z)$, where $A(z)$ is determined by solving the equation:

$$A(z) = 2D\Delta c - \tfrac{1}{2}(\Delta c)^2 - r\Delta c \frac{D-z}{2D-z} + D\Delta c \log_e$$

$$\left[ \frac{(2D-z)D}{(D-z)r + (2D-z)\Delta c} \right] +$$

$$rD \frac{D-z}{2D-z} \log_e \left[ \frac{(D-z)r}{(D-z)r + (2D-z)\Delta c} \right]$$

for values of $z = n(')$, where $z \leq D$, n is an integer, z' is an initial depth interval based on aliasing considerations, D is a depth to a reflector being surveyed; $\Delta c$ represents a CDP increment, chosen to be either z' or z'/2, r is set equal to r', and r' is an initial surface offset interval based on aliasing considerations.

55. A method for sending and receiving seismic signals, as recited in claim 54, wherein:

the plurality of seismic sources are positioned at a plurality of distances, r, measured from the surface intercept of the wellbore to a position of seismic receiver at or near the surface of the earth, and the plurality of seismic receivers are positioned at a Plurality of depths, z, in the wellbore, measured from the surface intercept of the wellbore to a position in the wellbore of a seismic receivers, such that the plurality of distances, r, and the plurality of depths, z, which are available for mapping a reflector at depth, D, measured from the surface of the earth, along a perpendicular to said surface, to the reflector, are grouped into CDP radial offset bins according to the equation:

$$r_{CDP} = \frac{(D-z)r}{2D-z}$$

in which $r_{CDP}$ is a distance measured radially from an axis running vertically through the wellbore to a common depth point on a reflector being mapped, and CDP radial offset bins are sets of data that are treated as representing a common depth point on the reflector being mapped.

56. A method for sending and receiving seismic signals, which comprises:
   a. sending a plurality of seismic signals from a plurality of seismic sources placed along or near the surface of the earth, so that a first distance between a pair of adjacent seismic source positions decreases exponentially as a second distance from the closer of the pair of adjacent seismic source positions to the wellbore increases; plurality of seismic signals from a
   b. reflecting the plurality of reflectors to form a plurality of reflected seismic signals;
   c. receiving the plurality of reflected seismic signals at a plurality of seismic receivers placed in a wellbore; and
   d. recording the plurality of reflected seismic signals so received.

57. A method for sending and receiving seismic signals, as recited in claim 56, wherein the plurality of seismic signals are generated from a plurality of seismic source positions such that a distribution of CDP fold recorded by the system is substantially equalized across a reflector surveyed.

58. A method for sending and receiving seismic signals, as recited in claim 57, wherein:
   the plurality of seismic sources are positioned such that equation:

$$\Delta r = (e^{\alpha r'})(r')$$

is satisfied, wherein $\Delta r$ is the first distance, measured between a pair of adjacent seismic source positions, r is the second distance, measured from the closer of the pair of adjacent seismic source positions to the wellbore, r' is a predetermined value representing an initial spacing interval based on aliasing considerations, $\alpha$ is a constant, and e is a constant approximately equal to 2.718.

59. A method for sending and receiving seismic signals, as recited in claim 58, wherein:
   $\alpha$ is calculated by using linear regression to determine the slope of a plot of r, $\log_e A(r)$, where A(r) is determined by solving the equation:

$$A(r) = 2D\Delta c - \tfrac{1}{2}(\Delta c)^2 - r\Delta c \frac{D-z}{2D-z} + D\Delta c \log_e \left[ \frac{D(2D-z)}{r(D-z) + \Delta c(2D-z)} \right] +$$

$$rD\frac{D-z}{2D-z} \log_e \left[ \frac{(D-z)r}{(D-z)r + \Delta c(2D-z)} \right]$$

for values of $r = n(r')$, where $r \leq 2D$, n is an integer, r' is the initial surface offset interval based on aliasing considerations, Z is set equal to zero, D is a depth to a reflector being surveyed; and $\Delta c$ represents a CDP increment, chosen to be either r' or 2.

60. A method of positioning the plurality of seismic receivers, as recited in claim 59, wherein:
   the plurality of seismic receivers are positioned at a plurality of depths, z, in the wellbore, measured from the surface intercept of the wellbore to a position in the wellbore of a seismic receiver, and a plurality of seismic sources are positioned at a plurality of distances, r, measured from the surface intercept of the wellbore to a position, at or near the surface of the earth, of a seismic source, such that the plurality of depths, z, and the plurality of distances, r, which are available for mapping a reflector at depth, D, measured from the surface of the earth, along a perpendicular to said surface, to the reflector, are grouped into CDP radial offset bins according to the equation:

$$r_{CDP} = \frac{(D-z)r}{2D-z}$$

in which $r_{CDP}$ is a distance measured radially from an axis running vertically through the wellbore to a common depth point on the reflector being mapped, and CDP radial offset bins are sets of data that are treated as representing a common depth point on the reflector being mapped.

* * * * *

UNITED STATES PATENT AND TRADEMARK OFFICE
CERTIFICATE OF CORRECTION

PATENT NO. : 5,111,437

DATED : May 5, 1992

INVENTOR(S) : James A. Rice

It is certified that error appears in the above-identified patent and that said Letters Patent is hereby corrected as shown below:

Table I, shown below, is added to the specification following Column 8, line 41.

TABLE I

The following computer program may be used in carrying out certain embodiment of the invention.

```
IF DO ISN
          C
          C  SPREAD - VSP EQUAL FOLD SPREAD FOR SPECIFIED REFLECTOR
          C
      1         DIMENSION R(1000),Z(1000),RCDP(50)
      2         INTEGER FOLD(50)
      3         REAL D/10000./
      4         INTEGER MCDP/50/
          C SET UP CDP BINS
      5         DRCDP=D/MCDP
      6         DO 6 I=1, MCDP
   1  7             RCDP(I)=(FLOAT(I)-1.)*DRCDP
   1  8             WRITE (6,102) I, RCDP(I)
   1  9   102     FORMAT (' CDPBIN#', I4,'        RCDP = ',F8.0)
   1 10       6 CONTINUE
          C
          C DETERMINE ALPHA AND BETA
          C
     11         DRO=200.
     12         DZO=200.
```

UNITED STATES PATENT AND TRADEMARK OFFICE
CERTIFICATE OF CORRECTION

PATENT NO. : 5,111,437
DATED : May 5, 1992
INVENTOR(S) : James A. Rice

It is certified that error appears in the above-identified patent and that said Letters Patent is hereby corrected as shown below:

Table I continued

```
     IF DO ISN
              C COMPUTE AREA(R)
           13         ZZ=0.
           14         FAC1=0.
           15         FAC2=0.
 5         16         FAC3=0.
           17         FAC4=0.
              C OVER 2**6 WOULD BE PAST R=2*D
           18         NR=7
           19         DO 201 I=1,NR
10      1  20            RR=DRO*2**(I-1)
        1  21            FRAC1=(2.*D*D-D*ZZ)/(D*RR-ZZ*RR+2.*D*DRCDP-ZZ*DRCDP)
        1  22            FRAC2=(D*RR-RR*ZZ)/(D*RR-ZZ*RR+2.*D*DRCDP-ZZ*DRCDP)
        1  23            A=2.*D*DRCDP-.5*DRCDP**2-DRCDP*(D-ZZ)*RR/(2.*D-ZZ)
        1  24            A=A+D*DRCDP*LOG(FRAC1)+
15                          ((D-ZZ)*RR*D/(2.*D-ZZ))*LOG(FRAC2)
        1  25            IF(A.EQ.0.) GO TO 201
        1  26            ELA=LOG(A)
        1  27            WRITE(6,701) I,RR,ZZ,A,ELA
        1  28    701     FORMAT(' ',I2, ' R=',F8.0,' Z=',F8.0,'
20                          A=',F12.2,' LA=',F8.4)
              C FIT LINE TO LOG(A) VS. RR
        1  29            FAC1=FAC1+1.*NR*LOG(A)*RR
        1  30            FAC2=FAC2+RR
        1  31            FAC3=FAC3+LOG(A)
25      1  32            FAC4=FAC4+1.*NR*RR**2
        1  33    201     CONTINUE
```

UNITED STATES PATENT AND TRADEMARK OFFICE
CERTIFICATE OF CORRECTION

PATENT NO. : 5,111,437

DATED : May 5, 1992

INVENTOR(S) : James A. Rice

It is certified that error appears in the above-identified patent and that said Letters Patent is hereby corrected as shown below:

Table I continued

```
     IF DO ISN
              C ALPHA IS SLOPE
             34        ALPHA=(FAC1-FAC2*FAC3)/(FAC4-FAC2**2)
             35        WRITE(6,711) ALPHA
             36    711 FORMAT(' ===== ALPHA ====',F20.10)
 5            C COMPUTE AREA(Z)
             37     RR=DRO
             38     FAC1=0.
             39     FAC2=0.
             40     FAC3=0.
10           41     FAC4=0.
              C OVER 2**5 WOULD BE PAST Z=D
             42     NZ=6
             43     DO 202 I=1,NZ
        1    44       ZZ=DZO*2**(I-1)
15      1    45       FRAC1=(2.*D*D-D*ZZ)/(D*RR-ZZ*RR+2.*D*DRCDP-ZZ*DRCDP)
        1    46       FRAC2=(D*RR-RR*ZZ)/(D*RR-ZZ*RR+2.*D*DRCDP-ZZ*DRCDP)
        1    47       A=2.*D*DRCDP-.5*DRCDP**2-DRCDP*(D-ZZ)*RR/(2.*D-ZZ)
        1    48       A=A+D*DRCDP*LOG(FRAC1)+
                         ((D-ZZ)*RR*D/(2.*D-ZZ))*LOG(FRAC2)
20      1    49       IF(A.EQ.0.) GO TO 202
        1    50       ELA=LOG(A)
        1    51       WRITE(6,702) I,RR,ZZ,A,ELA
        1    52   702 FORMAT(' ',I2,' R=',F8.0,' Z=',F8.0,' A=',F12.2,'
                         LA=',F8.4)
25            C FIT LINE TO LOG(A) VS. ZZ
        1    53       FAC1=FAC1+1.*NZ*LOG(A)*ZZ
        1    54       FAC2=FAC2+ZZ
        1    55       FAC3=FAC3+LOG(A)
        1    56       FAC4=FAC4+1.*NZ*ZZ**2
30      1    57   202 CONTINUE
```

UNITED STATES PATENT AND TRADEMARK OFFICE
CERTIFICATE OF CORRECTION

PATENT NO. : 5,111,437

DATED : May 5, 1992

INVENTOR(S) : James A. Rice

It is certified that error appears in the above-identified patent and that said Letters Patent is hereby corrected as shown below:

Table I continued

```
IF DO ISN
            C BETA IS SLOPE
         58      BETA=(FAC1-FAC2*FAC3)/(FAC4-FAC2**2)
         59      WRITE(6,712) BETA
         60  712 FORMAT(' ===== BETA =====',F20.10)
            C
            C COMPUTE AREA IN (R,Z)SPACE AVAILABLE TO RDCP-->RCDP+DRCDP
                   BIN
         61      DO 40 I=1,MCDP
      1  62        AREA=2.*D*DRCDP-0.5*DRCDP**2-DRCDP*RCDP(I)
      1  63        AREA=AREA+D*DRCDP*LOG(D/(RCDP(I)+DRCDP))
      1  64        IF(RCDP(I).NE.0.) THEN
   1  1  65          AREA=AREA+RCDP(I)*D*LOG(RCDP(I)/(RCDP(I)+DRCDP))
   1  1  66          ENDIF
      1  67        WRITE(6,110) I,RCDP(I),AREA
      1  68  110   FORMAT('CDPBIN#',I4,'   RCDP=',F8.0,'
                      AREA=',E12.4)
      1  69   40 CONTINUE
            C
            C SET UP SHOT AND RECEIVER LOCATIONS IN EXPONENTIAL
                   DISTRIBUTION
            C
```

UNITED STATES PATENT AND TRADEMARK OFFICE
CERTIFICATE OF CORRECTION

PATENT NO. : 5,111,437
DATED : May 5, 1992
INVENTOR(S) : James A. Rice

It is certified that error appears in the above-identified patent and that said Letters Patent is hereby corrected as shown below:

Table I continued

```
    IF DO ISN
              C LOCATE SHOT POINTS
           70     DZ=DZO
           71     Z(1)=0
           72     NSHOT=1
 5         73     DO 5 I=1, 1000
        1  74        Z(I+1)=Z(I)+DZ
        1  75        DZ=DZO*2.718**(BETA*Z(I+1))
        1  76        NSHOT=NSHOT+1
        1  77        IF((Z(I+1)+DZ). GE.D) GO TO 888
10      1  78        WRITE(6,101) I,Z(I)
        1  79 101    FORMAT(' SHOT#',I4,'      DEPTH=',F8.0
        1  80   5 CONTINUE
           81 888 CONTINUE
              C SET UP VARIABLY SPACED RECEIVERS
15         82     DR=DRO
           83     R(1)=DRO
           84     NRECV=1
           85     DO 7 I=1, 1000
        1  86        R(I+1)=R(I)+DR
20      1  87        DR=DRO*2.718**(ALPHA*R(I+1))
        1  88        NRECV=NRECV+1
        1  89        IF((R(I+1)+DR). GE.(2.*D)) GO TO 889
        1  90        WRITE(6,103) I,R(I)
        1  91 103    FORMAT(' RECVR#',I4,'      OFFSET=,F8.0)
25      1  92   7 CONTINUE
           93 889 CONTINUE
           94     WRITE(6,301) NSHOT,NRECV
           95 301 FORMAT(' NSHOT=',I10,'      NRECV=',I10)
              C
```

UNITED STATES PATENT AND TRADEMARK OFFICE
CERTIFICATE OF CORRECTION

PATENT NO. : 5,111,437
DATED : May 5, 1992
INVENTOR(S) : James A. Rice

It is certified that error appears in the above-identified patent and that said Letters Patent is hereby corrected as shown below:

Table I continued

```
     IF DO ISN
                C COMPUTE FOLD DISTRIBUTION VS. RCDP
                C
            96        MCDP1=MCDP-1
            97        DO 20 I=1,MCDP1
 5     1    98           FOLD(I)=0
        1   99           DO 15 J=1,NSHOT
        2  100              DO 10 K=1,NRECV
        3  101                 RZPT=R(K)*(1.-Z(J)/D)/(2.-Z(J)/D)
        3  102                 IF((RCDP(I).LE.RZPT).AND.
10                                (RCDP(I+1).GT.RZPT))THEN
     1  3  103                    RD=R(K)/D
     1  3  104                    ZD2=2.-Z(J)/D
     1  3  105                    IF(RD.LE.ZD2) FOLD(I)=FOLD(I)+1
     1  3  107                 ENDIF
15      3  108    10         CONTINUE
        2  109    15      CONTINUE
```

UNITED STATES PATENT AND TRADEMARK OFFICE
CERTIFICATE OF CORRECTION

PATENT NO. : 5,111,437  
DATED : May 5, 1992  
INVENTOR(S) : James A. Rice

It is certified that error appears in the above-indentified patent and that said Letters Patent is hereby corrected as shown below:

```
                      Table I continued 1 110    20       CONTINUE
           111            DO 30 I=1,MCDP
         1 112               WRITE(6,100) I,FOLD(I)
  20     1 113   100        FORMAT('CDPBIN#',I4,'    FOLD=',I6)
         1 114    30       CONTINUE
           115            STOP
           116            END
```

Signed and Sealed this

Third Day of August, 1993

Attest:

MICHAEL K. KIRK

*Attesting Officer*   *Acting Commissioner of Patents and Trademarks*